Aug. 28, 1962 F. H. GARDNER 3,051,913
AUTOMATIC GAIN CONTROL AMPLIFIER CIRCUITRY
Filed Oct. 12, 1959
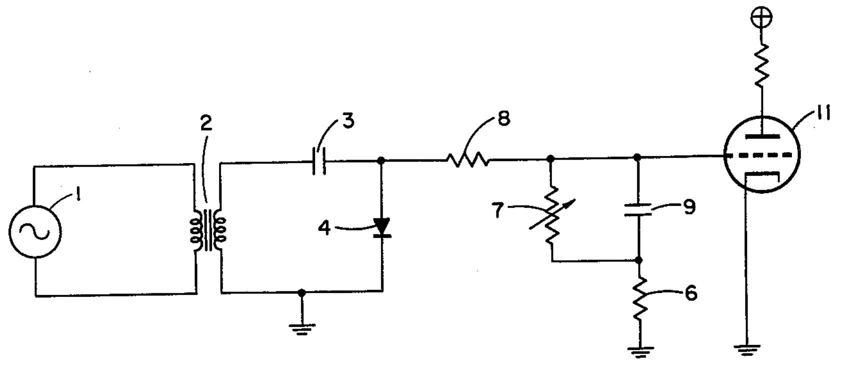
INVENTOR.
FREDERICK H. GARDNER
BY Robert Nathans
ATTORNEY United States Patent Office 3,051,913 Patented Aug. 28, 1962

3,051,913

AUTOMATIC GAIN CONTROL AMPLIFIER CIRCUITRY

Frederick H. Gardner, Rochester, N.Y., assignor to General Dynamics Corporation, Rochester, N.Y., a corporation of Delaware Filed Oct. 12, 1959, Ser. No. 846,021
2 Claims. (Cl. 330—136)

The present invention relates to amplifier circuits.

It is a principal object of the present invention to provide an improved amplifier.

It is a further object of the present invention to provide amplifying circuitry which facilitates changing the D.C. bias applied to the control electrode of an amplifying device without appreciably affecting an A.C. signal applied to the control electrode of the amplifying device.

It is a further object of the present invention to provide amplifying circuitry having automatic gain control.

Further objects and advantages of the present invention will become apparent as the following description proceeds and the features of novelty which characterize the invention will be pointed out with particularity in the claims annexed to and forming a part of this specification.

For a better understanding of the invention, reference may be had to the accompanying drawing which discloses a preferred embodiment of the invention.

Referring now to the accompanying drawing, an A.C. source 1 is disclosed coupled to the primary winding of transformer 2. The secondary winding of transformer 2 is connected across a series circuit including coupling capacitor 3 and diode 4. When the signal present across the secondary winding of transformer 2 becomes positive with respect to ground, current flows through diode 4, which is forward-biased, and capacitor 3 thereby to partially charge capacitor 3. Current will also flow through resistors 6, 7, 8 and capacitor 9 but this current will be negligible compared to the aforementioned current flowing through diode 4 due to the high impedance of the series-connected resistors. When the signal present across the secondary winding of transformer 2 becomes negative with respect to ground, diode 4 becomes back-biased so that capacitor 3 cannot discharge through the diode. However, capacitor 3 discharges to a small extent through resistors 6, 7, 8 and capacitor 9 at this time. After one cycle of operation, the right-hand plate of capacitor 3 will be negative with respect to ground because some charge will remain in the capacitor. This is so because the impedance of the abovementioned discharge path is considerably greater than the resistance of the charging path including forward-biased diode 4. Assuming the peak amplitude of the input signal remains the same, each subsequent cycle will cause a net increase in the charge present within capacitor 3 until a point is reached where the quantity of charge entering the capacitor through forward-biased diode 4 equals the quantity of charge removed from the capacitor through the aforementioned discharge path. A portion of the A.C. signal applied to resistor 8 will be present on the grid of vacuum tube 11 and will be amplified by it. A portion of the D.C. component of the signal applied to resistor 8 will also be present on the grid of vacuum tube 11 to provide for the necessary biasing voltage.

The D.C. bias applied to vacuum tube 11 is altered by changing the value of variable resistor 7. If the resistance of resistor 7 is decreased, the signals applied to the grid of vacuum tube 11 will fluctuate about a voltage level which is less negative with respect to ground than before the resistance was decreased, or in other words, the bias is reduced. Increasing the resistance of variable resistor 7 will, of course, have the opposite effect. The value of capacitor 9 is selected so that the capacitive reactance displayed by capacitor 9 to the A.C. signal is small compared to the resistance of variable resistor 7. Accordingly, changes in the value of variable resistor 7 will have substantially no effect on the A.C. impedance of the parallel circuit which comprises resistor 7 and capacitor 9, and therefore the amplitude of the A.C. signal present on the grid of vacuum tube 11 will remain substantially the same regardless of changes in the D.C. bias applied to the tube.

Capacitor 3 and diode 4 are arranged to provide automatic gain control for the amplifier. As the peak amplitude of the signal produced by A.C. source 1 increases, the signal applied to resistor 8 fluctuates about a more negative voltage level, since capacitor 3 is charged to a greater extent than before by the greater positive-going voltage swings. This means that the D.C. component present on the grid of vacuum tube 11 becomes more negative, the amplification factor is reduced, and as a result the amplitude of the output signal produced by vacuum tube 11 remains substantially the same.

In summary, applicant has provided an amplifying circuit having automatic gain control which facilitates changes in the D.C. bias applied to the amplifying tube without substantially changing the amplitude of the A.C. signal applied to the tube.

It should be obvious that a transistor may be utilized in place of the vacuum tube shown and that a large range of frequencies may be amplified by the circuitry disclosed if proper adjustment is made in the capacitance of capacitors 3 and 9.

While there has been disclosed what is at present considered to be the preferred embodiment of the invention, other modifications will readily occur to those skilled in the art. It is not therefore desired that the invention be limited to the specific arrangement shown and described and it is intended in the appended claims to cover all such modifications as fall within the true spirit and scope of the invention.

What is claimed is:

1. An automatic gain control circuit comprising, a source of alternating current having a first and second terminal, a capacitor having a first and second terminal, a non-linear impedance device having a first and second terminal, a first resistance device having a first and second terminal and a second resistance device having a first and second terminal, an amplifying device having an amplification factor which is proportional to the bias applied thereto, said amplifying device having an input terminal, an output terminal, and a control terminal, means for coupling the first terminal of said source of alternating current to the first terminal of said capacitor, means for coupling the second terminal of said capacitor to the first terminal of said first resistance device and to the first terminal of said non-linear impedance device, means for connecting the second terminal of said first resistance device to the control terminal of said amplifying device and to the first terminal of said second resistance device, and means for coupling the second terminal of said source of alternating current to the second terminal of said nonlinear impedance device, to the second terminal of said second resistance device, and to the input terminal of said amplifying device.

2. The combination as set forth in claim 1 wherein said second resistance device comprises a third and fourth resistance, said third resistance being variable, and a capacitor connected in parallel with said third resistance, said capacitor having a reactance which is small compared to the impedance of said third resistance.

References Cited in the file of this patent

UNITED STATES PATENTS

| | | |
|---|---|---|
| 2,431,307 | Chatterjea et al. | Nov. 25, 1947 |
| 2,633,534 | Anderson | Mar. 31, 1953 |
| 2,722,600 | Forbes et al. | Nov. 1, 1955 |

FOREIGN PATENTS

| | | |
|---|---|---|
| 142,701 | Australia | Aug. 6, 1951 |
| 142,997 | Australia | Aug. 20, 1951 |